(12) United States Patent
Sagov

(10) Patent No.: US 6,759,755 B2
(45) Date of Patent: Jul. 6, 2004

(54) ENERGY CONVERTER

(75) Inventor: Magomet S. Sagov, Vestfossen (NO)

(73) Assignee: Clavis Technology AS, Hokksund (NO)

( * ) Notice: Subject to any disclaimer, the term of this patent is extended or adjusted under 35 U.S.C. 154(b) by 0 days.

(21) Appl. No.: 10/182,308
(22) PCT Filed: Jan. 29, 2001
(86) PCT No.: PCT/NO01/00030
§ 371 (c)(1), (2), (4) Date: Oct. 21, 2002
(87) PCT Pub. No.: WO01/58211
PCT Pub. Date: Aug. 9, 2001

(65) Prior Publication Data
US 2003/0098587 A1 May 29, 2003

(30) Foreign Application Priority Data
Jan. 28, 2000 (NO) .......................................... 20000470

(51) Int. Cl.⁷ .............................. H02P 9/04; F01P 9/00; F02B 59/00
(52) U.S. Cl. ..................................... 290/1 R; 123/46 E
(58) Field of Search ............................. 123/46 E, 46 R, 123/46 SC, 24 A; 310/12–39; 290/1 R

(56) References Cited
U.S. PATENT DOCUMENTS

| 3,234,395 A | | 2/1966 | Colgate | |
| 3,675,031 A | * | 7/1972 | Lavigne | 290/1 R |
| 3,766,399 A | * | 10/1973 | Demetrescu | 290/40 R |
| 3,984,707 A | | 10/1976 | McClintock | |
| 3,995,427 A | * | 12/1976 | Demetrescu | 60/595 |
| 4,480,599 A | * | 11/1984 | Allais | 123/46 R |
| 4,532,431 A | * | 7/1985 | Iliev et al. | 290/4 R |
| 5,002,020 A | | 3/1991 | Kos | |
| 5,554,922 A | | 9/1996 | Kunkel | |
| 5,678,522 A | * | 10/1997 | Han | 123/46 SC |
| 5,850,111 A | | 12/1998 | Haaland | |
| 5,893,343 A | | 4/1999 | Rigazzi | |
| 6,170,442 B1 | * | 1/2001 | Beale | 123/46 B |
| 6,199,519 B1 | * | 3/2001 | Van Blarigan | 123/46 R |

FOREIGN PATENT DOCUMENTS

| FR | 2585769 | 2/1987 |
| GB | 2114673 | 8/1983 |
| GB | 2206931 | 1/1989 |
| GB | 2334385 | 8/1999 |

* cited by examiner

Primary Examiner—Nicholas Ponomarenko
Assistant Examiner—Julio C. Gonzalez
(74) Attorney, Agent, or Firm—Merchant & Gould, P.C.

(57) ABSTRACT

An energy converter comprising a free piston engine with a cylinder (2), a piston (3), a body connected to the piston such as an armature (11) of a linear electric generator (10). The energy converter comprises a spring device (15), via which the armature (11) is springingly connected to the housing (1), and which is arranged to permit an oscillation of the armature (11) in the piston's (3) direction of movement with a natural frequency $f_c$ relative to the stator (12).

3 Claims, 4 Drawing Sheets

ENERGY CONVERTER

The present invention relates to an electromagnetically reciprocating apparatus which is used as, for example a fluid pump.

Fundamental construction of one example of a conventional electromagnetically reciprocating apparatus, which is used as a fluid pump (compressor, vacuum pump), is shown in FIG. 1. The conventional apparatus comprises: electromagnet 100, which is consisted of iron core 100a and coil 100b and repeats magnetization and demagnetization for one cycle of AC current; piston assembly 102, which includes magnetic material member 102a to be drawn by magnetized electromagnet 100, and front and rear pistons 102b, 102c disposed before and behind magnetic material member 102; front and rear cylinders 104, 106 for supporting front and rear pistons 102b, 102c of piston assembly 102; and a compression elastic member, wherein that is compression coil spring 108, which is compressed by piston assembly 102 moved in a forward direction (movement in a rightward direction in FIG. 1) by magnetic action of electromagnet 100 and moves piston assembly 102 in a backward direction (movement in a leftward direction in FIG. 1) by elastic force when electromagnet 102 is demagnetized.

In the electromagnetically reciprocating apparatus of this kind, operation efficiency becomes maximum when a vibration system having piston assembly 102 and elastic member (coil spring 108) is reciprocated in a resonance state.

More specifically, piston assembly 102 is reciprocated in the resonance state and an amplitude of reciprocating movement thereof is maximum when the following equation (1) is satisfied. That is, maximum operation efficiency of the electromagnetically reciprocating apparatus can be obtained.

$$F = \frac{1}{2\pi}\sqrt{\frac{Ks + Kf}{M}} \quad (1)$$

where

F: the frequency of the commercial electric power source (the number of pluses of DC power source)

M: the mass of piston assembly 102

Kf: the spring constant of a gas sealed in a sealed space 104a formed in front cylinder 104 partitioned by front piston 104

Ks: the spring constant of coil spring 108 compressed by rear piston 102c

In a case that the electromagnetically reciprocating apparatus is used in different areas in which the commercial AC current have different frequency Fa, Fb (for example, Fa>Fb) to each other, at first, value of the spring constant (Ks+Kfa) of coil spring 108 and a gas in sealed space 104a, and the mass (M) of piston assembly 102 are set up in order to satisfy the following equation (2) and then make piston assembly 102 reciprocate in maximum amplitude of vibration in the area of frequency Fa.

$$Fa = \frac{1}{2\pi}\sqrt{\frac{Ks + Kfa}{M}} \quad (2)$$

where:

Kfa: the spring constant of a gas in sealed space 104a when the frequency is Fa

Then, in a case that the electromagnetically reciprocating apparatus, in which the various values are set as disclosed above, is used in the area of another frequency Fb, the following equation (3) is introduced.

$$Fb > \frac{1}{2\pi}\sqrt{\frac{Ks + Kfb}{M}} \quad (3)$$

where:

Kfb: the spring constant of a gas in sealed space 104a when the frequency is Fb

From the equation (3), it becomes clear that piston assembly 102 can not reciprocate in the resonance state because either the spring constant (Ks+Kfb) is too small or the mass (M) of piston assembly 102 is too big.

Therefore, in Japan which is divided into two areas having the frequency of 50 Hz and 60 Hz of the commercial electric power sources, in order to make the conventional apparatus of the kind obtain the most preferably resonance state in the different frequency areas, the piston weight and the spring constant of coil spring (the elastic member) 108 are changed. This cause troubles that a manufacturing of various kinds of vibration systems having resonance frequency which are consistent with various kinds of frequency of the commercial electric power sources, and an independent storage of various kinds of vibration systems are needed.

The present invention has been made in consideration of the above situation, and has as its object to provide an electromagnetically reciprocating apparatus which can easily adjust the resonance frequency of a vibration system consisted of the piston assembly and the compression elastic member, etc. without changing the piston weight and the spring constant, and can easily adjust the resonance frequency of the vibration system at a place in which the electromagnetically reciprocating apparatus is used.

The fundamental construction of the electromagnetically reciprocating apparatus 10 of this invention for dissolving the above stated problems is shown in FIG. 2. This electromagnetically reciprocating apparatus 10 comprises: electromagnet 12 which is consisted of iron core 12a and coil 12b and repeats magnetization and demagnetization for one cycle of AC current or for one pulse of DC current; piston assembly 14 which includes magnetic material member 14a to be drawn by magnetized electromagnet 12, and front and rear pistons 14b, 14c disposed before and behind magnetic material member 14a; frond and rear cylinders 16, 18 for supporting front and rear pistons 14b, 14c; and a compression elastic member, wherein that is compression coil spring 20, which is compressed by piston assembly 14 moved in a forward direction (movement in a rightward direction in FIG. 2) by magnetic action of electromagnet 12 and moves piston assembly 14 in a backward direction (movement in a leftward direction in FIG. 2) by elastic force when electromagnet 12 is demagnetized. An air hole 21 is mounted on rear cylinder 18 to communicate a sealed space partitioned in rear cylinder 18 by rear piston 14c of piston assembly 14 with the outside of rear cylinder 18, and valve means 22 is mounted on air hole 21 to adjust a resonance frequency of the vibration system having piston assembly 14 and compression coil spring 20.

In fluid working chamber 16a which is disposed in front cylinder 16 so as to be expanded and reduced its volume by the reciprocal movement of piston assembly 14, fluid suction valve 16c for sucking fluid into fluid working chamber 16a in a volume expansion process of fluid working chamber 16a, and fluid exhaust valve 16d for exhausting fluid from fluid working chamber 16a in a volume reduction process are mounted.

In electromagnetically reciprocating apparatus 10 constructed as described above, the adjustment of opening of valve means 22 causes a sympathetic vibration of piston assembly 14 by the different electric power sources having different frequency.

It is preferable that the valve means is formed on an end wall of a housing the inner space of which communicates with the atmosphere, one end of the air hole is open to the sealed space of the rear cylinder and the other end is open at the outer end face of end wall of housing, and the inner space of the housing is open on the outer end face of end wall of housing at a position near to the other end of the air hole. It is also preferable that the valve means comprises a cap-like valve casing hermetically mounted on the outer end face of end wall of housing so as to cause an end face opening of the inner space of the valve casing to cover the other end of the air hole and the opening of the inner space of the housing, and a valve body arranged in the inner space of the valve casing so as to be movable between a closed position where communication between the other end of the air hole and the opening of the inner space of the housing through the inner space of the valve casing is interrupted and an open position where communication between the other end of the air hole and the opening of the inner space of the housing through the inner space of the valve casing is allowed.

The valve means having the structure as described above can be easily assembled in or disassembled from the electromagnetically driven reciprocating apparatus so as to perform repair and inspection.

In the electromagnetically reciprocating apparatus of this invention constructed as described above, it is preferable that the valve body of the valve means is accommodated in the inner space of the valve casing so as to pivot about an axis extending along the axis of the rear cylinder and is movable between the open and closed positions upon pivotal movement thereof, and the valve body includes an operation pin extending from the inner space of the valve casing in a direction along the axis thereof and exposed on an outer surface of the valve casing.

This valve means is more compact and has better operability.

When the electromagnetically reciprocating apparatus of this invention is constructed as described above, it is preferable that the compression elastic member is a compression coil spring arranged in the rear cylinder. When the compression elastic member is arranged as described above, the electromagnetically reciprocating apparatus can be made more compact.

Therefore, an electromagnetically reciprocating compressor or vacuum pump of this kind, which can be used in Japan having two areas in which the frequencies of commercial electric power sources are 50 Hz and 60 Hz, produces a sympathetic vibration of the vibration system by DC current pulse or AC current, having frequency between 50 Hz and 60 Hz, when the following (1) to (4) steps are practiced in the following order.

(1) The weight (M) of piston assembly 14 and the spring constant (Ks) of coil spring 20 are set up to make piston assembly 14 sympathetically vibrate at 50 Hz (specific frequency).

(2) The volume of sealed space 18a in the rear side is set up to make a gas in sealed space 18a has a spring constant (Kr) which produces sympathetic vibration at 60 Hz (desired frequency).

(3) Air hole 21, having an enough opening area so as not to resist the sympathetic vibration at 50 Hz, is mounted on rear cylinder 18.

(4) Valve means 22 is mounted on air hole 21. After execution of the above steps (1) to (4), the vibration system can sympathetically vibrate either at 50 Hz or at 60 Hz by adjusting the opening of valve means 22.

In the electromagnetically reciprocating apparatus of this invention, the resonance frequency of vibration system can be adjusted by every easy operation. That is, the movement of piston assembly can be adjusted to make a maximum vibration (resonance frequency state), which is preferable in the usage of the apparatus in the areas having different frequency of AC current, by the only adjustment of valve means without the changing of piston weight and the spring constant to make the resonance frequency of vibration system be inconsistent with the frequency of supplied electric current.

Further, the possibility of adjustment described above produces a very superior technical advantages that a fluid pump of high performance is easily gained even if the piston weight and the spring contact have a slight variation.

This invention can be more fully understood from the following detailed description when taken in conjunction with the accompanying drawings, in which.

Figure 7:
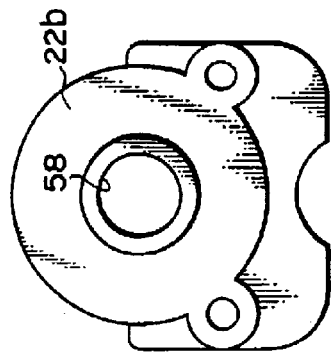
Figure 10:
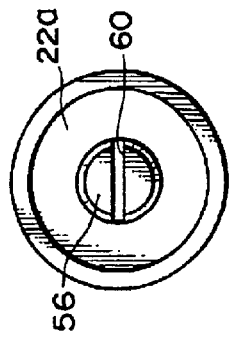
Figure 6:
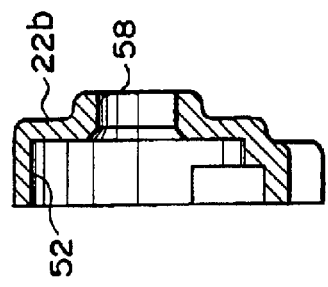
Figure 9:
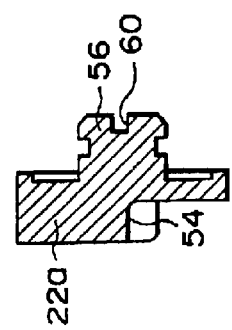
Figure 5:
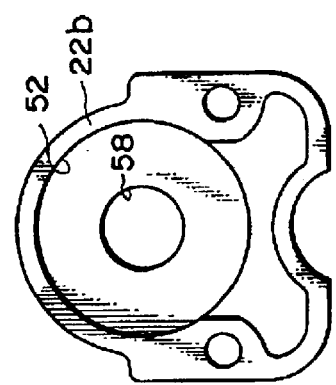
Figure 8:
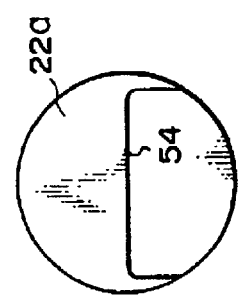
Figure 1:
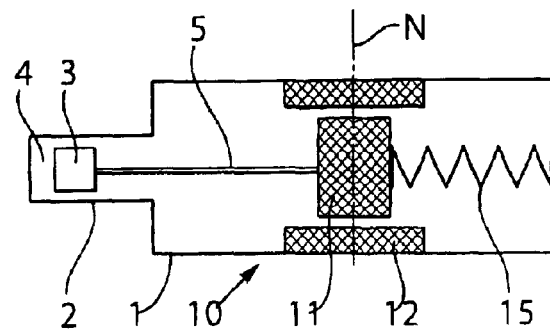
Figure 2:
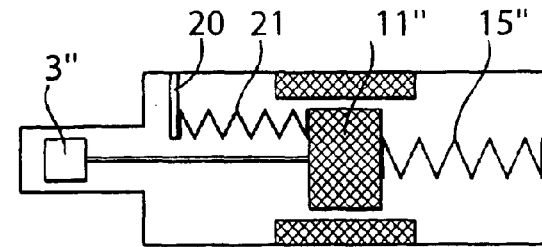
Figure 3:
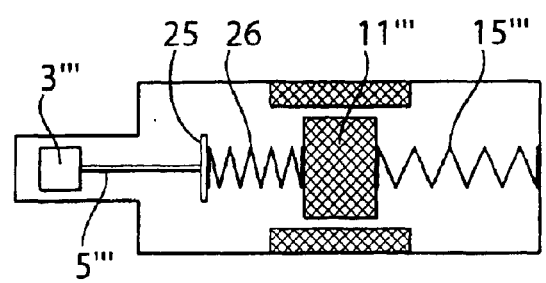
Figure 4:
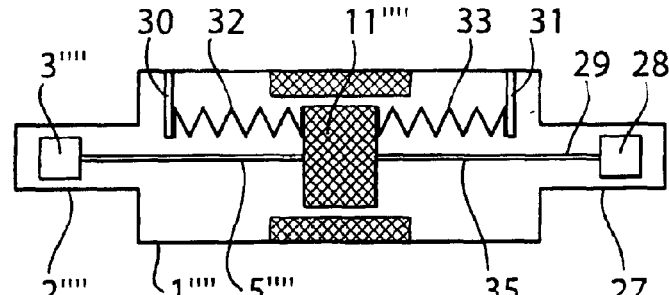
Figure 5:
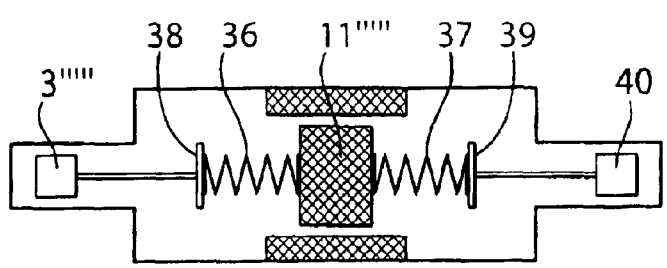
Figure 6:
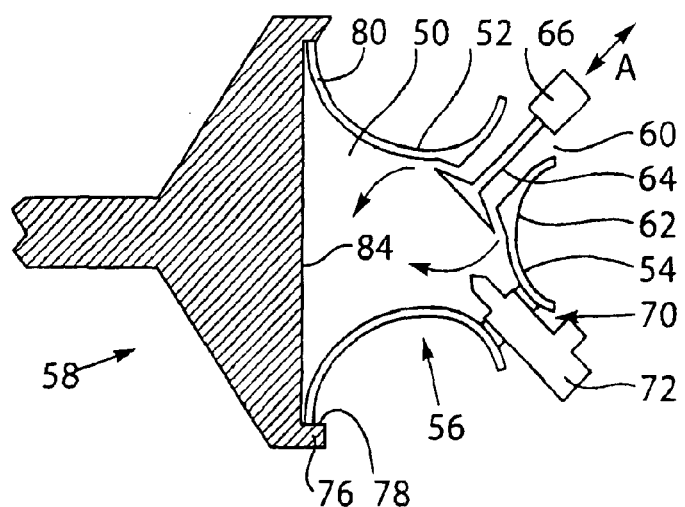
Figure 7:
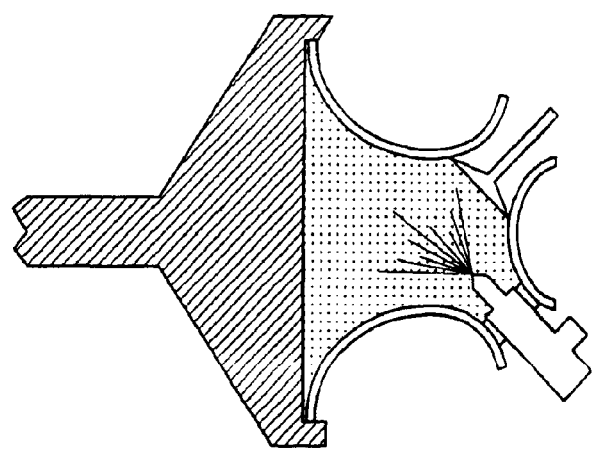
Figure 8:
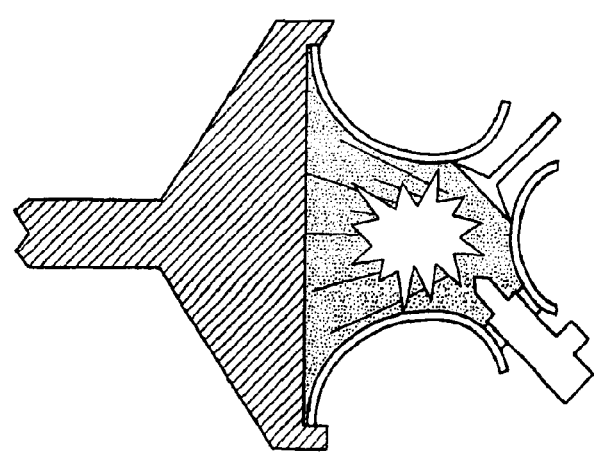
Figure 9:
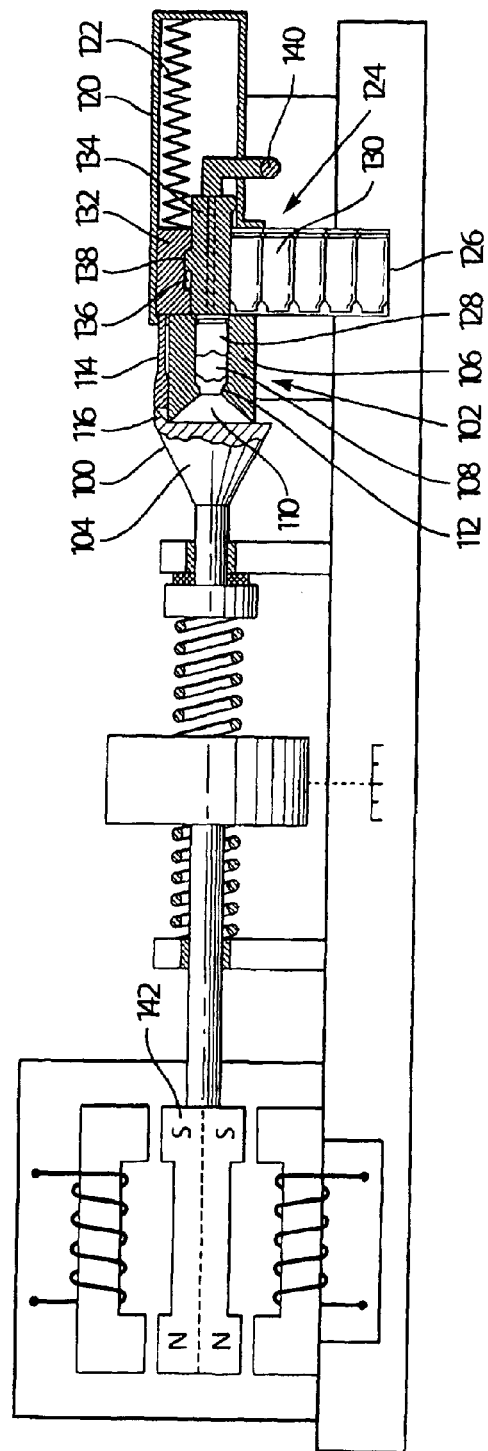
Figure 10:
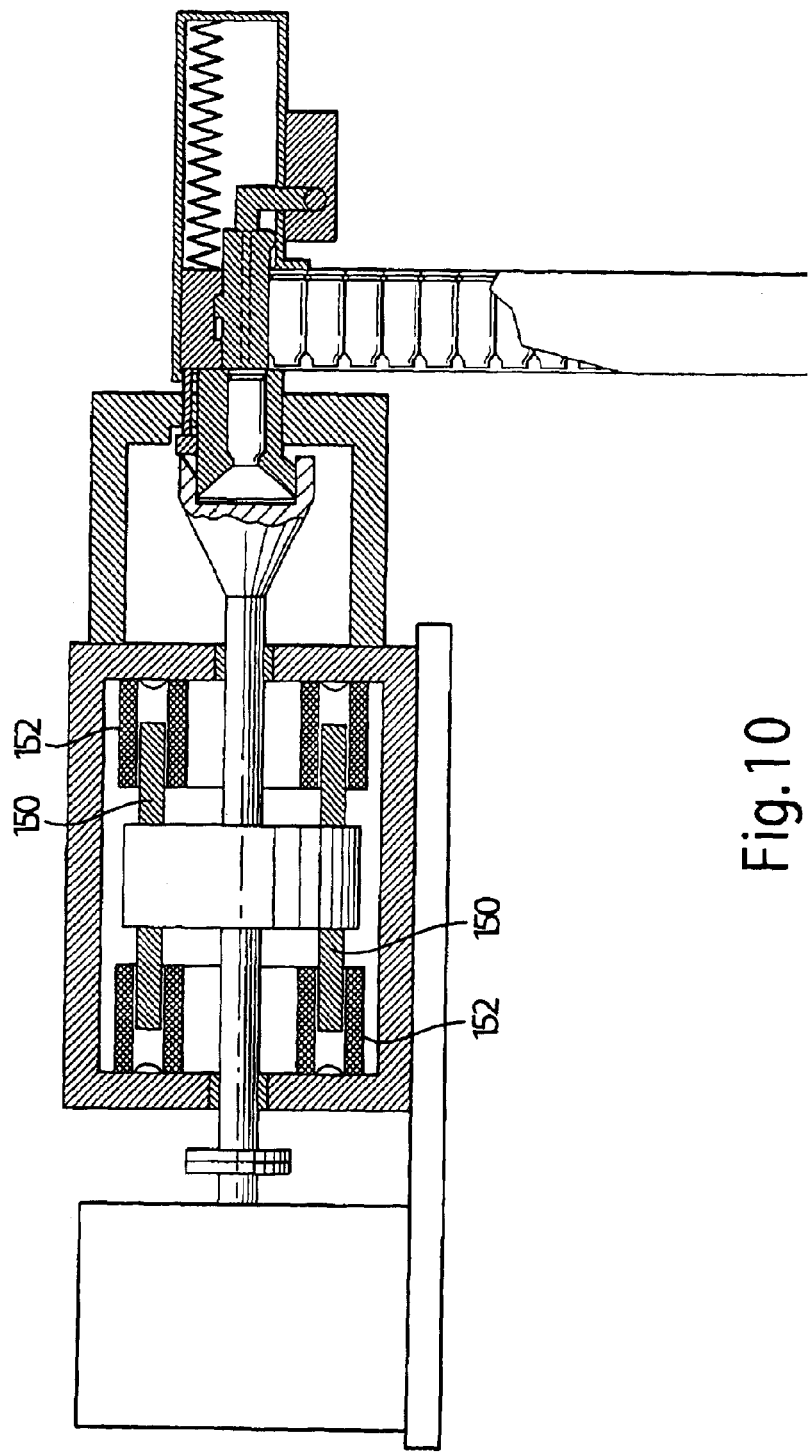
Figure 1:
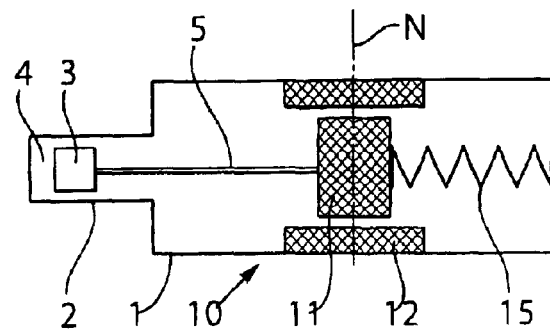
Figure 2:
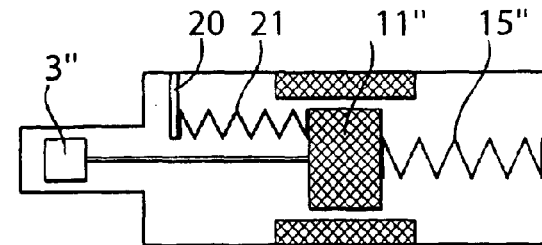
Figure 3:
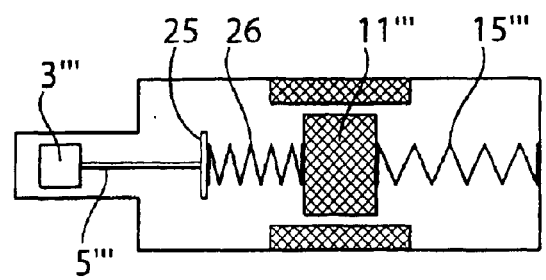
Figure 4:
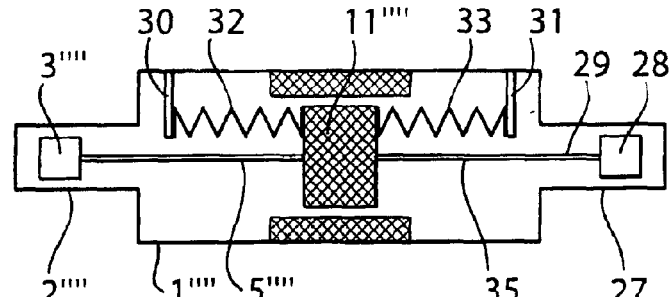
Figure 5:
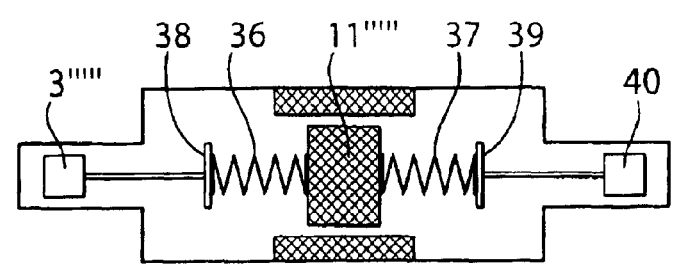
Figure 6:
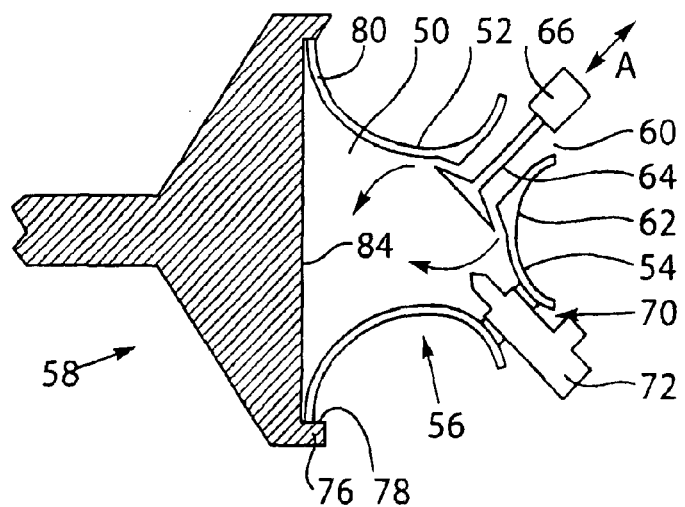
Figure 7:
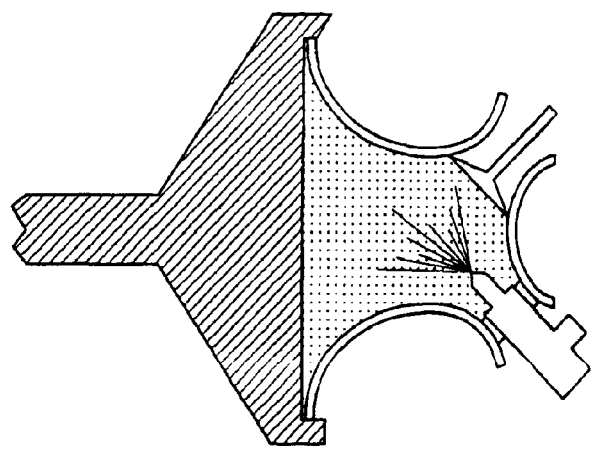
Figure 8:
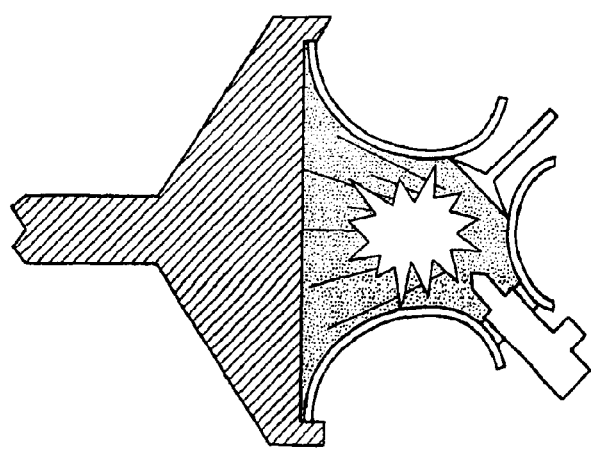
Figure 9:
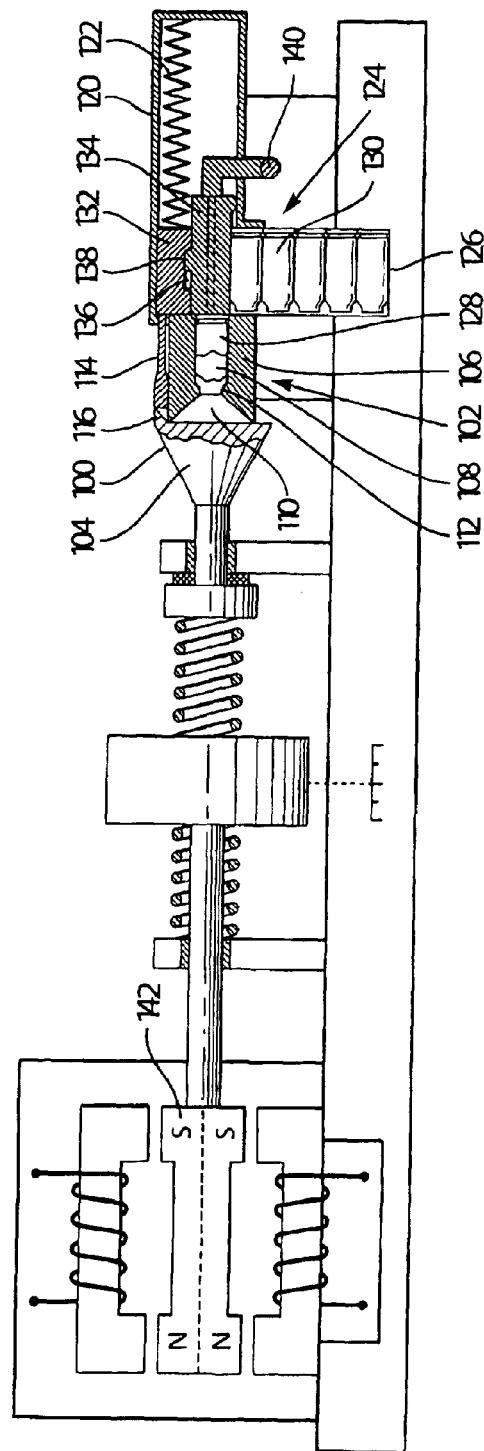
Figure 10:
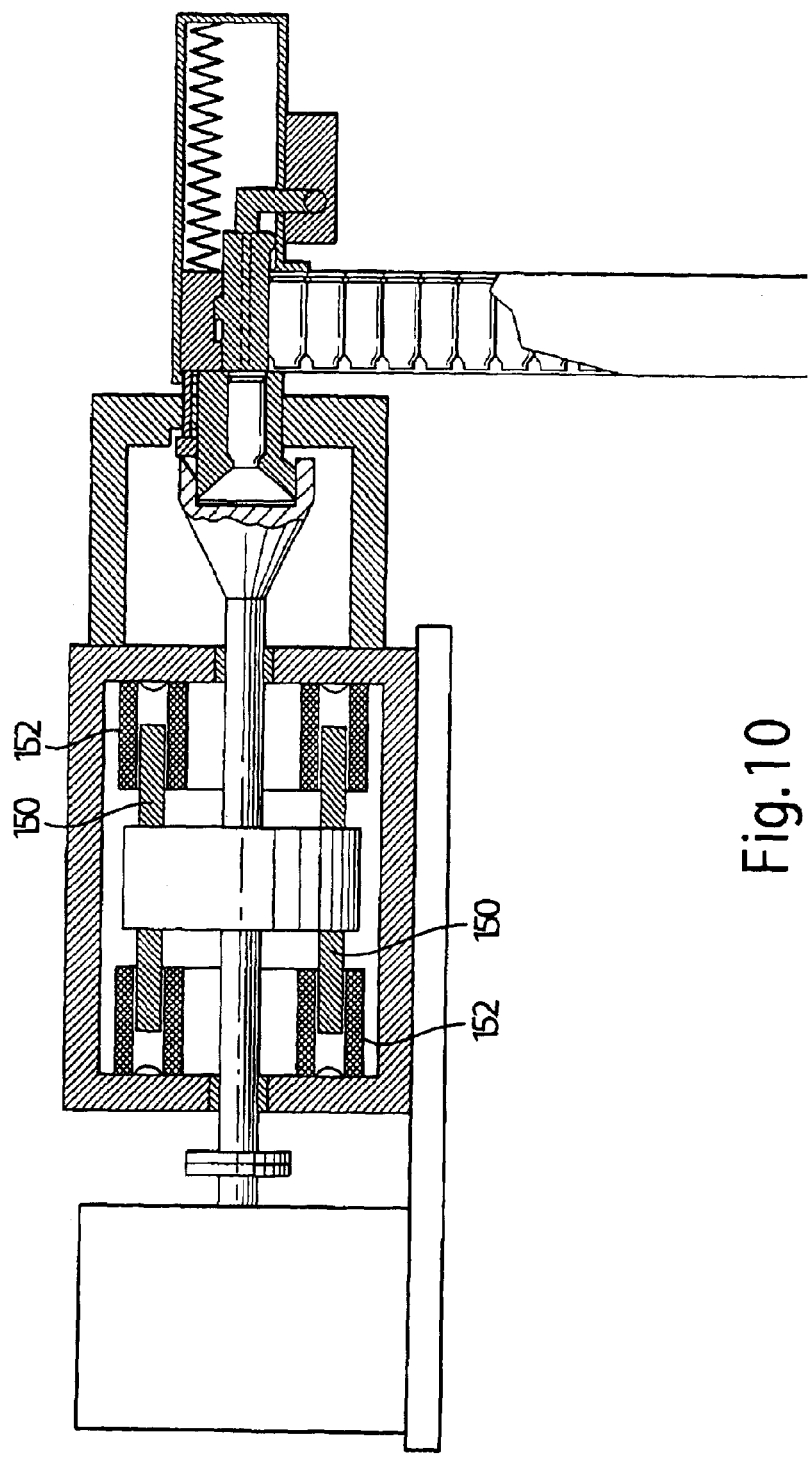

FIGS. 5, 6, and 7 are a front view, a longitudinal sectional view, and a rear view, respectively, of a valve casing of valve means mounted on the pump; and FIGS. 8, 9, and 10 are a front view, a longitudinal sectional view, and a rear view, respectively, of a valve body of the valve means mounted on the pump.

Figure 3:
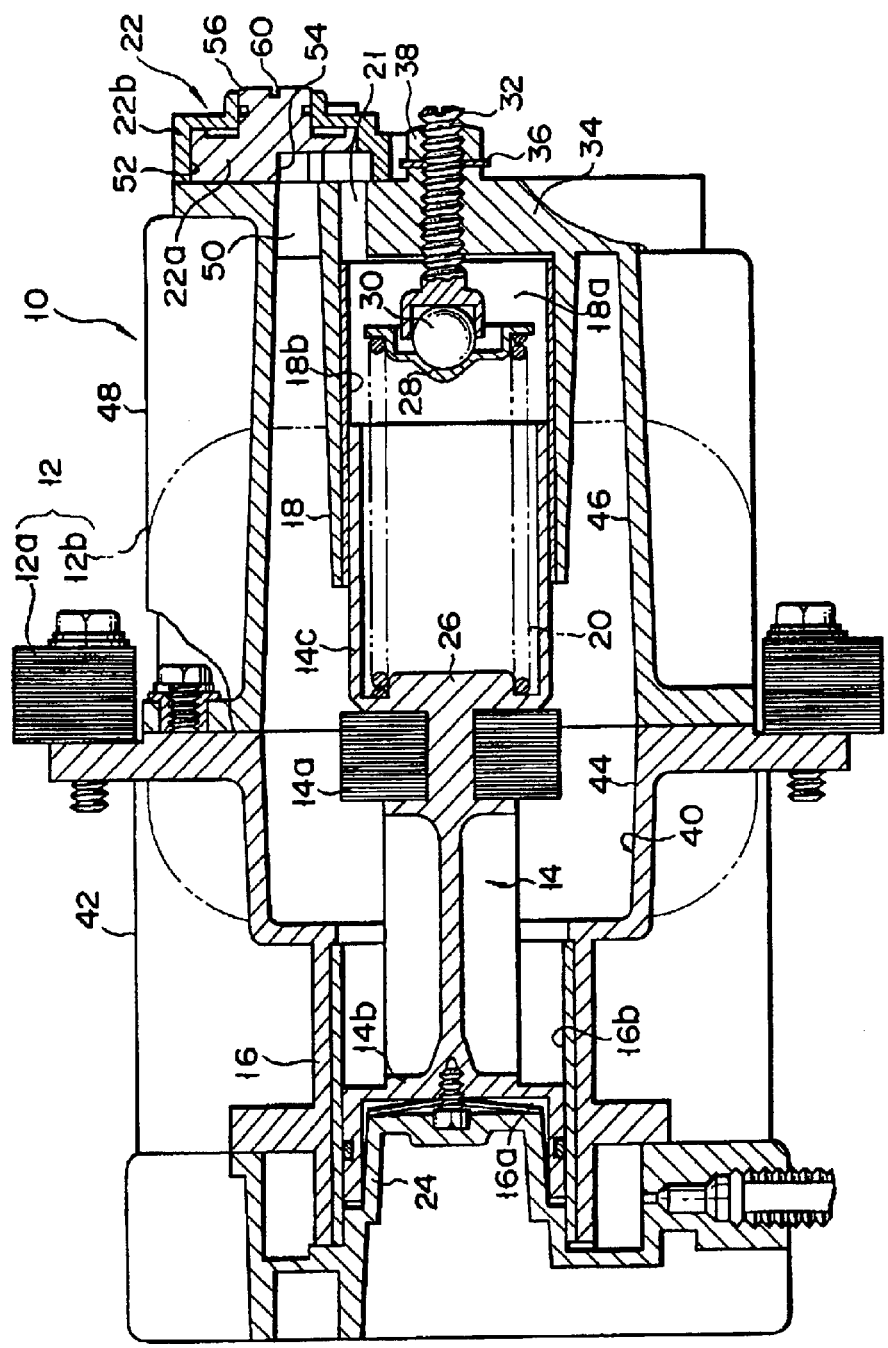
FIG. 3 is a schematic longitudinal sectional view of the electromagnetically reciprocating pump according to an embodiment of the present invention, in which a piston assembly of the pump is located at a top dead center.

In FIG. 3, a fluid pump as one embodiment of the electromagnetically reciprocating apparatus according to the inventions is shown. Electromagnetically reciprocating apparatus 10 shown in FIG. 3 comprises: electromagnet 12 which is consisted of iron core 12a and coil 12b and repeats magnetization and demagnetization for one cycle of AC current or for one pulse of DC current; piston assembly 14 which includes magnetic material member 14a to be drawn by magnetized electromagnet 12, and front and rear pistons 14a, 14c disposed before (in the leftward direction in FIG. 3) and behind (in the rightward direction in FIG. 3) magnetic material member 14; front and rear cylinders 16, 18 for supporting front and rear pistons 14b, 14c through cylinder liners 16b, 18b; compression coil spring 20 which is compressed by piston assembly 14 drawn by magnetic action of electromagnet 12 to move in forward direction (movement in a rightward direction in FIG. 3) and moves piston assembly 14 in a backward direction (movement in a leftward direction in FIG. 3) by elastic force when electromagnet 12 is demagnetized; front-side fluid working chamber 16a which is formed by front piston 14b, front cylinder 16, and front cover 24, and repeats expansion and decreasing of its volume by the reciprocal movement of piston assembly 14 to press air and to exhaust the pressed air through a fluid exhaust port not shown; rear-side sealed space 18a which is formed by rear piston 14c and rear cylinder 18, and repeats decreasing and expansion of its volume by the reciprocal movement of piston assembly 14; air opening 21 for communicating rear-side sealed space 18 with an outer space; and valve means 22 for adjusting the degree of air flow between rear-side sealed space 18a and the outer space through air hole 21. Valve body 22a of valve means 22 is guided by valve casing 22b to be pivotable. One end of compression coil spring 20 is supported by a closed end of indented portion 26 formed on the end face of rear piston 14c, and the other end thereof is supported by spring support 28. Spring support 28 is placed on adjustment screw 32 through ball 30, and adjustment screw 32 is threadably engaged in end wall 34 of rear cylinder 18 to adjust compression strength of compression coil spring 20. Lock nut 38 is threadably fitted on the outer-projected end of adjustment screw 32 through washer 36 to lock adjustment screw 32 on end wall 34 of rear cylinder 18.

A housing of electromagnetically reciprocating apparatus 10 is constructed by front housing member 42 with stepped aperture 40 and rear housing member 48 with aperture 46 having the same diameter as that of large-diameter portion 44 of stepped aperture 40 of front housing member 42. Rear housing member 48 is coaxially fixed to front housing member 42 such that aperture 46 is adjacent to large-diameter portion 44 of stepped aperture 40 of front housing member 42.

Figure 2:
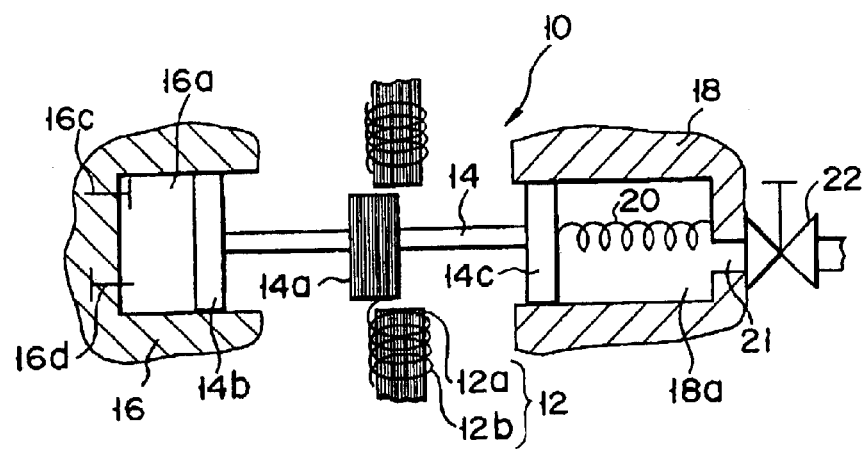
FIG. 2 is a schematical view showing a fundamental construction of electromagnetically reciprocating apparatus of this invention.

A small-diameter portion of stepped aperture 40 serves as front cylinder 16 for front piston 14b. The end portion of front cylinder 16 which is far away from large-diameter portion 44 is closed by cylinder head member 24 fixed to front housing member 42. A fluid suction valve 16c and fluid exhaust valve 16d both of which are shown in FIG. 2 are mounted on cylinder head member 24. Aperture 46 of rear housing member 48 is opened to atmospheric air through an opening (not shown).

Cylindrical rear cylinder 18 is formed on the end wall of rear housing member 48 so as to be coaxial to the axis of aperture 46 in aperture 46 of rear housing member 48. The end wall of rear housing member 48 constructs end wall 34 of rear cylinder.

Air hole 21 is formed in end wall 34 of rear housing member 48. One end of air hole 21 is open to rear-side sealed space 18a defined between the end face of rear piston 14c and end wall 34 of rear housing member 48, and the other end of which is open on the outer end face of end wall 34. Second air hole 50 is also formed in end wall 34. One end of second air hole 50 is open to the inner space of rear housing member 48 in the radially outward portion than rear cylinder 18. The other end of second air hole 50 is open on the outer end face of end wall 34 at a position near the other end of first air hole 21.

Valve means 22 is formed on the outer end face of end wall 34 to control a flow rate of a fluid between rear-side sealed space 18a of rear cylinder 18 and an inner space (this inner space is communicated with atmospheric air through the above-mentioned opening (not shown)) of rear housing member 48 through first and second air holes 21 and 50.

Valve casing 22b of valve means 22 is formed to have a cap-shape which is detachably and hermetically fixed to the outer end face of end wall 34 so as to cover both the openings of first and second-air holes 21 and 50 at the outer end face of end wall 34. Disc-like valve body reception recess 52, as best shown in FIGS. 5 and 6, is formed in the inner space of valve casing 22b opposing, as shown in FIG. 3, both the openings of first and second air holes 21 and 50 at the outer end face of end wall 34. Valve body 22a having a substantially disc-like shape, as best shown in FIGS. 8 to 10, is fitted in recess 52, as shown in FIG. 3. Fluid flow recess 54 is formed in the lower half on one end face of valve body 22a. Operation pin 56 extending in an axial direction of valve body 22a is integrally formed on the central portion of the other end face of valve body 22a. Operation pin 56 is inserted in through hole 58 (best shown in FIGS. 5 to 7) formed at the center of the bottom surface of recess 52 of valve casing 22b and is exposed outside valve casing 22b. As shown in FIGS. 9 and 10, slot 60 is formed on the exposed end of operation pin 56 so as to be fitted with a screwdriver (not shown).

When the screwdriver (not shown) is rotated in one or the other direction after the tip of the screwdriver is engaged with slot 60, valve body 22a is rotated in valve body reception recess 52 of valve casing 22b in one or the other direction. Upon rotation, valve body 22a can move between an open position where fluid flow recess 54 corresponds to first and second air holes 21 and 50 shown in FIG. 3 and a closed position where an upper half (FIG. 8), on which fluid path recess 54 is not formed, on the one end face of valve body 22a corresponds to the first and second air holes 21 and 50.

When valve body 22a is located in the open position, as shown in FIG. 3, rear-side sealed space 18a of rear cylinder 18 communicates with an inner space (this space is communicated with atmospheric air through the above-mentioned opening (not shown)) of rear housing member 18 through first and second air holes 21 and 50. However, when valve body 22a is located at the closed position, communication between rear-side sealed space 18a of rear cylinder 18 and the inner space (this inner space is communicated with atmospheric air through the above-mentioned opening (not shown)) of rear housing member 18 through first and second air holes 21 and 50 is inhibited.

Therefor, when apparatus 10 is used in an area in which the frequency of commercial electric power source is 50 Hz, at first, valve body 22a is disposed at the open position to make first air hole 21 open, and then half-wave rectified AC current or DC current pulses is supplied to apparatus 10 to drive it. And, when apparatus 10 is used in an area in which the frequency of commercial electric power source is 60 Hz, at first, valve body 22a is disposed at the closed position to make first air hole 21 close, and then above described AC or DC current is supplied to apparatus 10.

Figure 4:
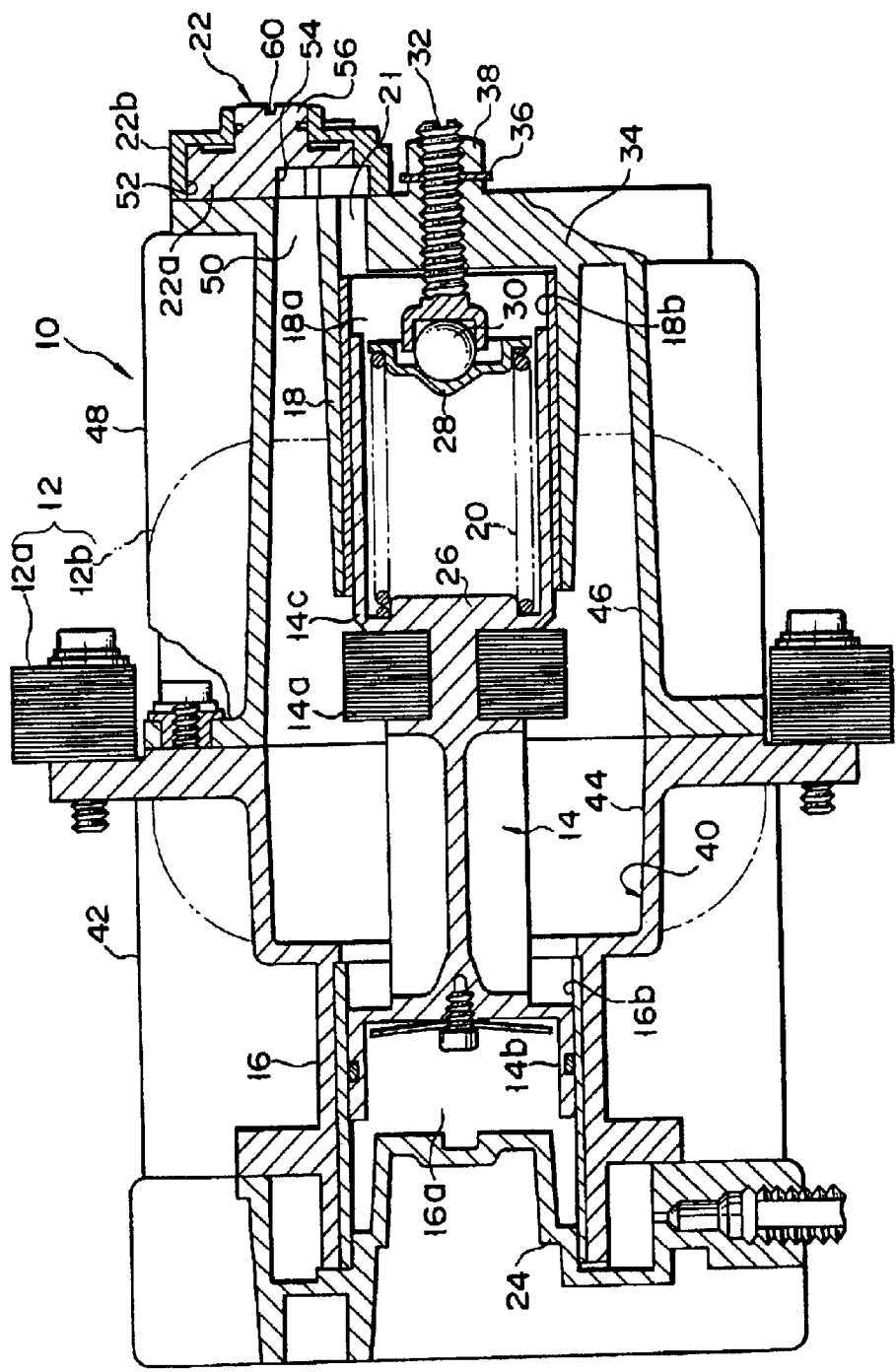
FIG. 4 is a schematic longitudinal sectional view of the electromagnetically reciprocating pump shown in FIG. 3, wherein the piston assembly is located at a bottom dead center.

When electromagnet 12 is energized, magnetic material member 14a is drawn in the rightward direction in FIG. 3 to move piston assembly 14 in the forward direction (movement in the rightward direction in FIG. 3), thereby coil spring 20 is compressed, as shown in FIG. 4. At the same time, the volume of fluid working chamber 16a of front cylinder 16 is expanded, and fluid suction valve 16c shown in FIG. 2 is opened to suck air into fluid working chamber 16a.

Then, when electromagnet 12 is deenergized, piston assembly 14 is moved in the backward direction (movement in the leftward direction in FIG. 4) by elastic force of coil spring 20. At this time, the volume of fluid working chamber 16a is decreased while air in fluid working chamber 16a is compressed. When pressure of air in fluid working chamber 16a reaches at a predetermined value, fluid exhaust valve 16d shown in FIG. 2 is opened to exhaust pressurized air in fluid working chamber 16a.

As described above, owing to repetition of magnetization and demagnetization in electromagnet 12, pressurized fluid is supplied to air consuming source connected to the fluid exhaust port not shown in which fluid exhaust valve 16d is mounted or air is sucked from a pressure reduction system connected to the fluid suction port not shown in which fluid suction valve 16c is mounted.

Even if this electromagnetically driven reciprocating fluid pump is used in different areas in which frequency of commercial electric power sources are different from each other, the pump can reciprocates piston assembly 14 with maximum amplitude (in the sympathetic vibration state) in every areas by adjusting degree of opening of valve member 22a which is mounted to correspond to rear-side sealed space 18a of rear cylinder 18.

In the above described explanation, electromagnetically reciprocating apparatus 10 is used in the two areas in which frequency of commercial AC electric power sources are 50 Hz and 60 Hz. However, apparatus 10 may be used in the other area, in which frequency of commercial AC electric power source is between 50 Hz and 60 Hz, by stepless regulation of valve body 22a to adjust the opening of first air hole 21.

What is claimed is:

1. An energy converter comprising:

a stationary part with a combustion chamber with an opening having a circumferential opening edge portion;

a movable part having a first end which is facing away from the opening and an axially opposite second end with a circumferential edge portion which is adapted to abut the edge portion of the stationary part and thereby close the opening, the movable part being axially displaceable away from the stationary part responsive to explosion or detonation of an explodable or detonable material within the combustion chamber; and a body which is connected to the first end of the movable part via an element having a spring-like resiliency in the axial direction, and which is adapted to be brought to a free oscillatory movement in the axial direction wider the influence of the element after a temporary axial displacement of the movable part, the movable part being adapted to be biased by the element towards the opening and to abut the opening edge portion, and to be moved away from the opening edge portion against the influence of the element by a detonation of the material and thereby to open the combustion chamber.

2. The energy converter according to claim 1, wherein the body is an armature of an electric linear generator.

3. The energy converter according to claim 1, wherein the cross section area of the combustion chamber is increasing axially towards the opening.

* * * * *

UNITED STATES PATENT AND TRADEMARK OFFICE
CERTIFICATE OF CORRECTION

PATENT NO. : 6,759,755 B2
APPLICATION NO. : 10/182308
DATED : July 6, 2004
INVENTOR(S) : Sagov It is certified that error appears in the above-identified patent and that said Letters Patent is hereby corrected as shown below:

Delete the title page, specification, drawings and claims and replaced with the attached title page, specification, drawings and claims.

Signed and Sealed this

Tenth Day of October, 2006

JON W. DUDAS
*Director of the United States Patent and Trademark Office*

(12) United States Patent
Sagov

(10) Patent No.: US 6,759,755 B2
(45) Date of Patent: Jul. 6, 2004

(54) ENERGY CONVERTER

(75) Inventor: Magomet S. Sagov, Vestfossen (NO)

(73) Assignee: Clavis Technology AS, Hokksund (NO)

( * ) Notice: Subject to any disclaimer, the term of this patent is extended or adjusted under 35 U.S.C. 154(b) by 0 days.

(21) Appl. No.: 10/182,308

(22) PCT Filed: Jan. 29, 2001

(86) PCT No.: PCT/NO01/00030

§ 371 (c)(1),
(2), (4) Date: Oct. 21, 2002

(87) PCT Pub. No.: WO01/58211

PCT Pub. Date: Aug. 9, 2001

(65) Prior Publication Data

US 2003/0098587 A1 May 29, 2003

(30) Foreign Application Priority Data

Jan. 28, 2000 (NO) .............................................. 20000470

(51) Int. Cl.$^7$ .............................. H02P 9/04; F01P 9/00; F02B 59/00
(52) U.S. Cl. ...................................... 290/1 R; 123/46 E
(58) Field of Search .............................. 123/46 E, 46 R, 123/46 SC, 24 A; 310/12–39; 290/1 R

(56) References Cited

U.S. PATENT DOCUMENTS

| 3,234,395 | A | | 2/1966 | Colgate |
| 3,675,031 | A | * | 7/1972 | Lavigne ...................... 290/1 R |
| 3,766,399 | A | * | 10/1973 | Demetrescu ............. 290/40 R |
| 3,984,707 | A | | 10/1976 | McClintock |
| 3,995,427 | A | * | 12/1976 | Demetrescu ................ 60/595 |
| 4,480,599 | A | * | 11/1984 | Allais ....................... 123/46 R |
| 4,532,431 | A | * | 7/1985 | Iliev et al. .................. 290/4 R |
| 5,002,020 | A | | 3/1991 | Kos |
| 5,554,922 | A | | 9/1996 | Kunkel |
| 5,678,522 | A | * | 10/1997 | Han ....................... 123/46 SC |
| 5,850,111 | A | | 12/1998 | Haaland |
| 5,893,343 | A | | 4/1999 | Rigazzi |
| 6,170,442 | B1 | * | 1/2001 | Beale ....................... 123/46 B |
| 6,199,519 | B1 | * | 3/2001 | Van Blarigan ............ 123/46 R |
| 2003/0098587 | A1 | | 5/2003 | Sagov |

FOREIGN PATENT DOCUMENTS

| FR | 258769 | 2/1987 |
| GB | 2114673 | 8/1983 |
| GB | 2206931 | 1/1989 |
| GB | 2334385 | 8/1999 |

* cited by examiner

*Primary Examiner*—Nicholas Ponomarenko
*Assistant Examiner*—Julio C. Gonzalez
(74) *Attorney, Agent, or Firm*—Merchant & Gould, P.C.

(57) ABSTRACT

An energy converter comprising a free piston engine with a cylinder (2), a piston (3), a body connected to the piston such as armature (11) of a linear electric generator (10). The energy converter comprises a spring device (15), via which the armature (11) is springingly connected to the housing (1), and which is arranged to permit an oscillation of the armature (11) in the piston's (3) direction of movement with a natural frequency $f_e$ relative to the stator (12).

3 Claims, 4 Drawing Sheets

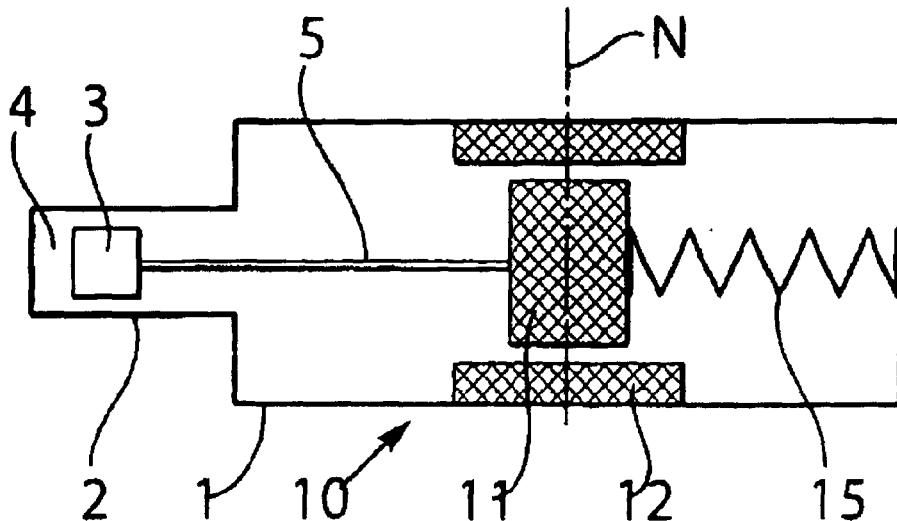

ENERGY CONVERTER

The invention relates to an energy converter comprising a free piston engine with a cylinder, a piston, a body connected to the piston and an elastic device, which is arranged to exert a force in the cylinder's longitudinal direction against the body and a corresponding reaction force against the cylinder.

From U.S. Pat. No. 5,002,020 there is known an energy converter of the above-mentioned type with an oscillating magnet. In this publication devices are also described for controlling the engine, and suitable devices of this kind can also be used for controlling the engine according to the description below.

In order to create an oscillation with a fixed frequency, the engine of the known energy converter comprises a separate frequency control device, thus increasing the complexity of the device. This also results in an increase in the price and maintenance costs of the device in addition to the risk of failure during operation.

Furthermore, from GB 2 206 931 it is known that a piston of a vacuum pump can be caused to oscillate when a magnet, hereinafter called an armature, of a linear electromotor, is operated by the electric field from a winding, hereinafter called a stator, which is fed with electric current from a public electricity network. In order to adapt the electromotor to different frequencies of the feeding current, the armature is connected to a chamber whose opening via which the chamber communicates with the ambient air, can be varied in such a manner that the oscillation frequency can be varied. The device illustrated here is not a generator, and the armature/piston assembly is not arranged for continued oscillation during an "idling condition" of the pump and the influence of the armature by a force, e.g. at intervals corresponding to a certain number of periods, in order to compensate for any amplitude reduction.

The object of the invention is to provide an energy converter of the aforementioned known type which is encumbered to a lesser degree by the above-mentioned disadvantages. Moreover, it is an object of the invention to provide an energy converter which adapts to a free piston engine to a linear electric generator in such a manner that an exceptionally high degree of efficiency is obtained.

Characterising features of the device according to the invention will be presented in the claims.

The invention will now be described in more detail with reference to the drawing which schematically illustrates embodiments of the device according to the invention.

FIGS. 1–5 illustrate a longitudinal section through five respective embodiments of an energy converter according to the invention.

FIGS. 6–8 illustrate a section through a combustion chamber of a device according to the invention during the introduction of a first fuel, introduction of a second fuel and a detonation of the fuels respectively, portions of the device being cut away.

FIG. 9 illustrates a longitudinal section through a sixth embodiment of a device according to the invention, where explosive charges and helical springs are employed to move an armature of the device.

FIG. 10 illustrates a longitudinal section through a seventh embodiment of a device according to the invention, where four pairs of uniformly polarised magnets are employed for moving the armature.

The terms right and left should be understood to refer to the direction towards the right and left edges respectively of the drawing as it is viewed by the reader. Components which have the same function in the different embodiments in FIGS. 1–5 have been given the same reference numerals with the addition of one or more apostrophes.

Figure 1:
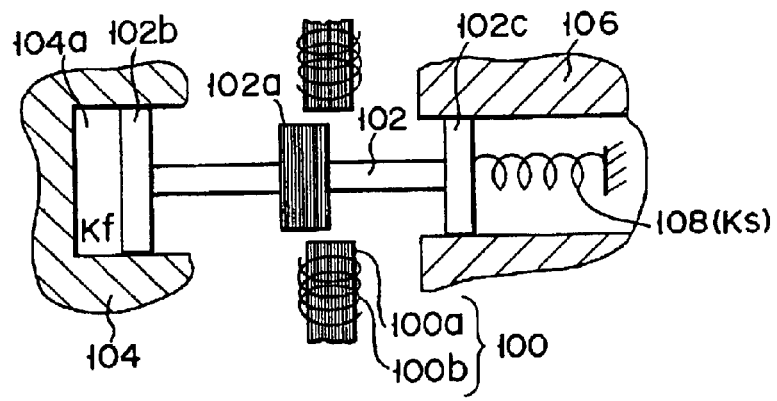
FIG. 1 is a schematical view showing a fundamental construction of conventional electromagnetically reciprocating apparatus.

As can be seen in FIG. 1, which illustrates the simplest embodiment, in a cylinder 2 of a housing 1 there is mounted a piston 3 which is arranged to be moved backwards and forwards in the cylinder 2. The cylinder 2 and the piston 3 are preferably components of an internal combustion engine with a combustion chamber 4 which is defined by the cylinder portion 2 and the piston 3. In the usual manner the engine may comprise components such as an inlet valve for admitting a combustion gas into the cylinder, and an outlet valve for releasing exhaust gas, sensors for establishing values of movement parameters for the piston, where these values can be supplied to a computer for control of the engine, etc., the components not being illustrated in the figures.

A piston rod 5 is rigidly connected via one of its ends with the piston 3 and rigidly connected via its other end with a movable part, hereinafter called an armature 11, of a linear electric generator 10. Near the armature 11, a stator 12 of the generator 10 is attached to the housing 1, it being understood that the armature 11 may be mounted in bearings (not shown) which support the armature 11, permitting a preferably linear movement of the armature 11 backwards and forwards relative to the stator 12, thereby inducing an electric current in the stator 12. This current can be conducted away from the stator 12 via suitable wires (not shown).

On the opposite side of the armature 11, between the armature 11 and the housing 1 there is mounted an elastic device comprising an elastic element such as a spring 15. When the piston rod 5 is not exerting any force against the armature 11, the spring attempts to bring the armature 11 to a neutral location N considered in the armature's direction of movement and in relation to the stator 12. When the armature is continuously at rest, it is therefore situated in this location N which is indicated by a dot-and-dash line in FIG. 1. If, e.g., a combustible gas is introduced to the combustion chamber 4 via valves, whereupon the valves are closed and the gas ignited, an increase in the temperature and pressure of the gas in the combustion chamber is obtained. A force is thereby exerted towards the right on the piston 3, which force is transferred via the piston rod 5 to the armature 11, and the piston and the armature are moved towards the right, thereby inducing an electric current in the stator 12. At the same time the spring 15 is compressed and the tension gradually increased, with the result that it exerts a corresponding increasing spring force which is directed towards the left. A reaction force is hereby also exerted by the stator 12 towards the left on the armature 11.

After a ventilation of the combustion chamber by opening the valves and the combustion gases no longer exert any compressive force on the piston 3 and the armature 11 has reached its outer dead point, the spring 15 causes an acceleration of the armature 11 to the left, whereupon a current is again induced in the stator 12, while at the same time the piston 3 is moved into the cylinder 2. After the armature 11 has hereby passed the neutral location N, the spring force is reversed, the spring 15 then being extended.

If the valves remain open and substantially only the spring influences the piston's and the armature's movement, the armature is caused to oscillate about the neutral location N. During this oscillation, with every movement of the armature 11 past the stator 12, a current is induced therein and the stator's amplitude is gradually reduced.

When the armature's amplitude has been reduced to such an extent that it falls below a predetermined minimum value, In the lower portion of the guide tube 120, e.g., there is provided an aperture 124 and to the guide tube 120 there is attached near the opening a magazine 126, which extends radially away from the guide tube 120.

The cylinder chamber 108 is arranged to receive an explosive body 128 whose shape is adapted to the cylinder chamber 108, the explosive body's position in the axial direction being determined by the abutment of its left-hand end portion against the contact shoulder 112.

The magazine 126 is arranged to receive a series of explosive bodies 130, these being stacked in the magazine 126 beside one another, whereby they are forced by a pushing device (not shown) in the direction towards the aperture 124. In a known manner, the explosive body's explosive and possibly the above-mentioned explosive ingredients may contain the oxygen required for an explosion of the explosive material.

Furthermore, the arrangement of the piston 104, the generator's armature and the springs which attempt to move them in order to create an oscillation are substantially of the type illustrated in FIG. 3.

A successive firing and shifting of explosive bodies in the cylinder chamber 108 will now be described in more detail, on the assumption that an explosive body 128 is initially located in the cylinder chamber 108 and a series of explosive bodies 130 are stacked in the magazine 126. It is further assumed that the piston 104, the sliding piece 132 and the ignition piece 134 are initially located in the position illustrated in FIG. 9.

The explosive body 128 which is located in the cylinder chamber 108 may be caused to explode, e.g., by means of electrical energy, which is supplied to the explosive body via an electrical ignition circuit (not shown), or, e.g., by the ignition piece 134 being gripped via a hoop 140, moved slightly to the right against the force exerted by the spring 122 and released, whereupon the ignition piece 134 is moved in the opposite direction on account of the spring 122 and the kinetic energy, which is released by the ignition piece's impact against the explosive body 128, causes an explosion thereof.

Due to the detonation pressure front, which is created after the explosion and which influences the piston 104, the piston 104 is moved very rapidly to the left in FIG. 9, thereby receiving a very large amount of kinetic energy. Since the piston is moved away from the cylinder, an opening is formed between the cylinder and the piston via which explosion residue in the cylinder chamber 108 under great pressure can flow into the pressure compartment 116, where it puts pressure on the push body 114 for a short period, thus causing it and thereby the sliding piece 132 to be moved to the right, whereby the spring 122 is compressed and constricted. When the left-hand end of the sliding piece's groove 136 comes into abutment against the pin 138, the ignition piece 134, which hitherto has been in abutment against the cylinder chamber's right-hand end, is also carried along.

When the sliding piece 132 and the ignition piece 134 have been moved so far axially that they no longer cover the aperture 124 in the guide tube 120, the explosive body 130 which is located nearest the guide tube 120 is pushed into it via the aperture 124. On account of the increased force of the spring 122, however, the sliding piece 132 and the ignition piece 134 will be reversed and moved to the left approximately at the moment when the explosive body is axially aligned with the cylinder chamber 108, whereupon the explosive body 130 is pushed into the cylinder chamber 108.

During this process the piston 104 has also been reversed and moved back to renewed abutment against the cylinder on account of the springs influencing the piston and the armature. The ignition piece's pin 138 is hereby located in the right-hand portion of the groove. When the left-hand end of the explosive body 130 comes into abutment against the contact shoulder 112, the explosive body 130 is stopped while the ignition piece 134 is pressed with great force against the explosive body's right-hand end portion. The explosive body 130 in the cylinder chamber 108 is thereby caused to explode and the above-mentioned process is repeated.

In a second embodiment of the invention whereby an explosive body located in the cylinder chamber 108 can be caused to explode according to other criteria determined by the piston's movement parameters, sensors (not shown) may be provided for measuring these movement parameters, such as the piston's axial position, amplitude, etc. These sensors (not shown) may for example be arranged to transmit signals to a computer (not shown) which calculates the values of the parameters, and which, e.g., is arranged to transmit an electrical firing signal to the cylinder chamber 108 via a suitable ignition circuit (not shown) for ignition of the explosive body which may momentarily be located in the cylinder chamber 108.

When there is a need for a supply of energy to the piston/armature device, e.g. on account of an excessive reduction in its amplitude, at a time which has been determined by the computer on the basis of the signals received from the sensors, an ignition signal is supplied to the explosive body 128 which is located in the cylinder chamber 108, with the result that the explosive body 128 explodes. A new explosive charge is then brought into the cylinder chamber 108 and caused to explode in the above-described manner after the next oscillation period or a multiple of periods.

In FIG. 10 a further embodiment of an energy converter according to the invention is illustrated, where the springs, which influence the piston and the armature, and which are illustrated in FIG. 9, have been replaced by four pairs of interacting magnets 150 and 152 respectively with the same polarity. By this means enormous forces can be created which can cause a reversal of the movement of the piston/armature device during its oscillation, thus preventing any collision between stationary and moving components.

Instead of arranging separate explosive bodies in a magazine, the explosive bodies may be arranged on a belt which is driven by means of a suitable device, e.g. like that used for operating a machine gun.

What is claimed is:

1. An energy converter comprising:

a stationary part with a combustion chamber with an opening having a circumferential opening edge portion;

a movable part having a first end which is facing away from the opening and an axially opposite second end with a circumferential edge portion which is adapted to abut the edge portion of the stationary part and thereby close the opening, the movable part being axially displaceable away from the stationary part responsive to explosion or detonation of an explodable or detonable material within the combustion chamber; and a body which is connected to the first end of the movable part via an element having a spring-like resiliency in the axial direction, and which is adapted to be brought to a free oscillatory movement in the axial direction under the influence of the element after a temporary axial displacement of the movable part, the movable part being adapted to be biased by the element towards the opening and to abut the opening edge portion, and to be moved away from the opening edge portion against the influence of the element by a detonation of the material and thereby to open the combustion chamber.

2. The energy converter according to claim 1, wherein the body is an armature of an electric linear generator.

3. The energy converter according to claim 1, wherein the cross section area of the combustion chamber is increasing axially towards the opening.

* * * * *

UNITED STATES PATENT AND TRADEMARK OFFICE
CERTIFICATE OF CORRECTION

PATENT NO. : 6,759,755 B2
APPLICATION NO. : 10/182308
DATED : July 6, 2004
INVENTOR(S) : Sagov It is certified that error appears in the above-identified patent and that said Letters Patent is hereby corrected as shown below:

Delete the title page, specification, drawings and claims and replaced with the attached title page, specification, drawings and claims.

This certificate supersedes Certificate of Correction issued October 10, 2006.

Signed and Sealed this

Twentieth Day of March, 2007

JON W. DUDAS
*Director of the United States Patent and Trademark Office*

United States Patent
Sagov

(10) Patent No.: US 6,759,755 B2
(45) Date of Patent: Jul. 6, 2004

(54) ENERGY CONVERTER

(75) Inventor: Magomet S. Sagov, Vestfossen (NO)

(73) Assignee: Clavis Technology AS, Hokksund (NO)

( * ) Notice: Subject to any disclaimer, the term of this patent is extended or adjusted under 35 U.S.C. 154(b) by 0 days.

(21) Appl. No.: 10/182,308

(22) PCT Filed: Jan. 29, 2001

(86) PCT No.: PCT/NO01/00030

§ 371 (c)(1),
(2), (4) Date: Oct. 21, 2002

(87) PCT Pub. No.: WO01/58211

PCT Pub. Date: Aug. 9, 2001

(65) Prior Publication Data

US 2003/0098587 A1 May 29, 2003

(30) Foreign Application Priority Data

Jan. 28, 2000 (NO) .............................. 20000470

(51) Int. Cl.$^7$ .............................. H02P 9/04; F01P 9/00; F02B 59/00
(52) U.S. Cl. .............................. 290/1 R; 123/46 E
(58) Field of Search .............................. 123/46 E, 46 R, 123/46 SC, 24 A; 310/12–39; 290/1 R

(56) References Cited

U.S. PATENT DOCUMENTS

| | | | |
|---|---|---|---|
| 3,234,395 A | | 2/1966 | Colgate |
| 3,675,031 A | * | 7/1972 | Lavigne .............. 290/1 R |
| 3,766,399 A | * | 10/1973 | Demetrescu .............. 290/40 R |
| 3,984,707 A | | 10/1976 | McClintock |
| 3,995,427 A | * | 12/1976 | Demetrescu .............. 60/595 |
| 4,480,599 A | * | 11/1984 | Allais .............. 123/46 R |
| 4,532,431 A | * | 7/1985 | Iliev et al. .............. 290/4 R |
| 5,002,020 A | | 3/1991 | Kos |
| 5,554,922 A | | 9/1996 | Kunkel |
| 5,678,522 A | * | 10/1997 | Han .............. 123/46 SC |
| 5,850,111 A | | 12/1998 | Haaland |
| 5,893,343 A | | 4/1999 | Rigazzi |
| 6,170,442 B1 | * | 1/2001 | Beale .............. 123/46 B |
| 6,199,519 B1 | * | 3/2001 | Van Blarigan .............. 123/46 R |
| 2003/0098587 A1 | | 5/2003 | Sagov |

FOREIGN PATENT DOCUMENTS

| | | |
|---|---|---|
| FR | 258769 | 2/1987 |
| GB | 2114673 | 8/1983 |
| GB | 2206931 | 1/1989 |
| GB | 2334385 | 8/1999 |

* cited by examiner

*Primary Examiner*—Nicholas Ponomarenko
*Assistant Examiner*—Julio C. Gonzalez
(74) *Attorney, Agent, or Firm*—Merchant & Gould, P.C.

(57) ABSTRACT

An energy converter comprising a free piston engine with a cylinder (2), a piston (3), a body connected to the piston such as armature (11) of a linear electric generator (10). The energy converter comprises a spring device (15), via which the armature (11) is springingly connected to the housing (1), and which is arranged to permit an oscillation of the armature (11) in the piston's (3) direction of movement with a natural frequency $f_e$ relative to the stator (12).

3 Claims, 4 Drawing Sheets

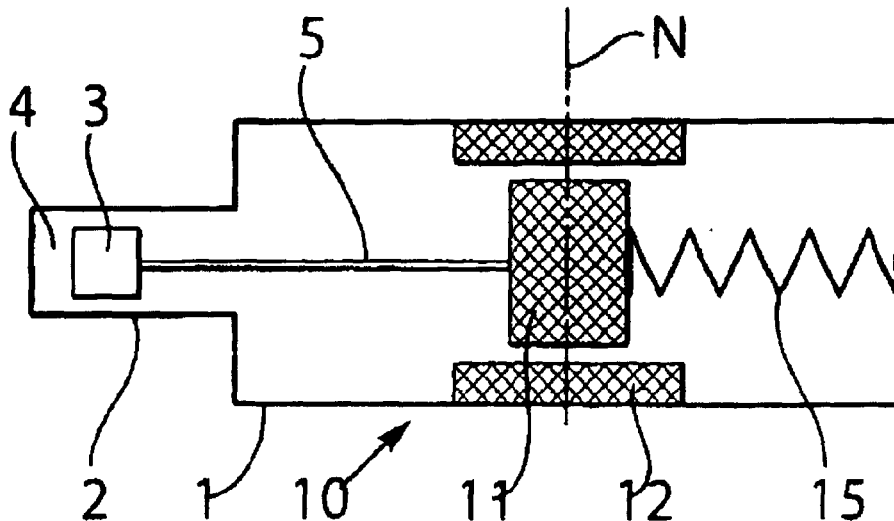

ENERGY CONVERTER

The invention relates to an energy converter comprising a free piston engine with a cylinder, a piston, a body connected to the piston and an elastic device, which is arranged to exert a force in the cylinder's longitudinal direction against the body and a corresponding reaction force against the cylinder.

From U.S. Pat. No. 5,002,020 there is known an energy converter of the above-mentioned type with an oscillating magnet. In this publication devices are also described for controlling the engine, and suitable devices of this kind can also be used for controlling the engine according to the description below.

In order to create an oscillation with a fixed frequency, the engine of the known energy converter comprises a separate frequency control device, thus increasing the complexity of the device. This also results in an increase in the price and maintenance costs of the device in addition to the risk of failure during operation.

Furthermore, from GB 2 206 931 it is known that a piston of a vacuum pump can be caused to oscillate when a magnet, hereinafter called an armature, of a linear electromotor, is operated by the electric field from a winding, hereinafter called a stator, which is fed with electric current from a public electricity network. In order to adapt the electromotor to different frequencies of the feeding current, the armature is connected to a chamber whose opening via which the chamber communicates with the ambient air, can be varied in such a manner that the oscillation frequency can be varied. The device illustrated here is not a generator, and the armature/piston assembly is not arranged for continued oscillation during an "idling condition" of the pump and the influence of the armature by a force, e.g. at intervals corresponding to a certain number of periods, in order to compensate for any amplitude reduction.

The object of the invention is to provide an energy converter of the aforementioned known type which is encumbered to a lesser degree by the above-mentioned disadvantages. Moreover, it is an object of the invention to provide an energy converter which adapts to a free piston engine to a linear electric generator in such a manner that an exceptionally high degree of efficiency is obtained.

Characterising features of the device according to the invention will be presented in the claims.

The invention will now be described in more detail with reference to the drawing which schematically illustrates embodiments of the device according to the invention.

FIGS. 1–5 illustrate a longitudinal section through five respective embodiments of an energy converter according to the invention.

FIGS. 6–8 illustrate a section through a combustion chamber of a device according to the invention during the introduction of a first fuel, introduction of a second fuel and a detonation of the fuels respectively, portions of the device being cut away.

FIG. 9 illustrates a longitudinal section through a sixth embodiment of a device according to the invention, where explosive charges and helical springs are employed to move an armature of the device.

FIG. 10 illustrates a longitudinal section through a seventh embodiment of a device according to the invention, where four pairs of uniformly polarised magnets are employed for moving the armature.

The terms right and left should be understood to refer to the direction towards the right and left edges respectively of the drawing as it is viewed by the reader. Components which have the same function in the different embodiments in FIGS. 1–5 have been given the same reference numerals with the addition of one or more apostrophes.

As can be seen in FIG. 1, which illustrates the simplest embodiment, in a cylinder 2 of a housing 1 there is mounted a piston 3 which is arranged to be moved backwards and forwards in the cylinder 2. The cylinder 2 and the piston 3 are preferably components of an internal combustion engine with a combustion chamber 4 which is defined by the cylinder portion 2 and the piston 3. In the usual manner the engine may comprise components such as an inlet valve for admitting a combustion gas into the cylinder, and an outlet valve for releasing exhaust gas, sensors for establishing values of movement parameters for the piston, where these values can be supplied to a computer for control of the engine, etc., the components not being illustrated in the figures.

A piston rod 5 is rigidly connected via one of its ends with the piston 3 and rigidly connected via its other end with a movable part, hereinafter called an armature 11, of a linear electric generator 10. Near the armature 11, a stator 12 of the generator 10 is attached to the housing 1, it being understood that the armature 11 may be mounted in bearings (not shown) which support the armature 11, permitting a preferably linear movement of the armature 11 backwards and forwards relative to the stator 12, thereby inducing an electric current in the stator 12. This current can be conducted away from the stator 12 via suitable wires (not shown).

On the opposite side of the armature 11, between the armature 11 and the housing 1 there is mounted an elastic device comprising an elastic element such as a spring 15. When the piston rod 5 is not exerting any force against the armature 11, the spring attempts to bring the armature 11 to a neutral location N considered in the armature's direction of movement and in relation to the stator 12. When the armature is continuously at rest, it is therefore situated in this location N which is indicated by a dot-and-dash line in FIG. 1. If, e.g., a combustible gas is introduced to the combustion chamber 4 via valves, whereupon the valves are closed and the gas ignited, an increase in the temperature and pressure of the gas in the combustion chamber is obtained. A force is thereby exerted towards the right on the piston 3, which force is transferred via the piston rod 5 to the armature 11, and the piston and the armature are moved towards the right, thereby inducing an electric current in the stator 12. At the same time the spring 15 is compressed and the tension gradually increased, with the result that it exerts a corresponding increasing spring force which is directed towards the left. A reaction force is hereby also exerted by the stator 12 towards the left on the armature 11.

After a ventilation of the combustion chamber by opening the valves and the combustion gases no longer exert any compressive force on the piston 3 and the armature 11 has reached its outer dead point, the spring 15 causes an acceleration of the armature 11 to the left, whereupon a current is again induced in the stator 12, while at the same time the piston 3 is moved into the cylinder 2. After the armature 11 has hereby passed the neutral location N, the spring force is reversed, the spring 15 then being extended.

If the valves remain open and substantially only the spring influences the piston's and the armature's movement, the armature is caused to oscillate about the neutral location N. During this oscillation, with every movement of the armature 11 past the stator 12, a current is induced therein and the stator's amplitude is gradually reduced.

When the armature's amplitude has been reduced to such an extent that it falls below a predetermined minimum value, the combustion gas in the combustion chamber 4 can be caused to combust once again, with the result that a force is again exerted on the armature 11 in order to increase its amplitude to a desired value. If there is only a need for a little current from the converter, there may be no need to implement combustion in the combustion chamber 4 for every oscillation of the armature 11.

The above-mentioned oscillation has a frequency corresponding to a natural frequency $f_o$ for the oscillation device which is formed from the spring 15, the armature 11, the piston 3 and the piston rod 5, and this frequency $f_o$ is dependent on the rigidity of the spring 15 and the total inert mass of the objects which are oscillating.

With this energy converter, therefore, it is a very simple matter to obtain an electric current with a fixed frequency corresponding to the natural frequency $f_o$.

FIG. 2 illustrates a second embodiment of an energy converter according to the invention. In this case a wall or flange 20 is provided between the piston 3'' and the armature 11'', and between the armature 11'' and this flange 20 there is mounted a spring 21. On the opposite side of the armature 11'' between it and the housing 1'' there is mounted a spring 15''. The armature 11'', the piston 3'' and the springs 15'' and 21 here form the oscillating device.

FIG. 3 illustrates a third embodiment of an energy converter according to the invention. Instead of the piston rod 5''' being rigidly connected to the armature 11''', it is provided with a contact plate 25, a spring 26 being provided between the contact plate 25 and the armature 11'''.

The force created by the piston 3''' in this case is therefore transferred to the armature 11''' via the spring 26.

The armature 11''', the piston 3''' and the springs 26 and 15''' here form the oscillating device.

FIG. 4 illustrates a fourth embodiment of an energy converter according to the invention.

On the side of the housing 1'''' facing away from the cylinder 2'''', there is provided a second cylinder 27 with a second piston 28 which is connected to a second piston rod 29. Between the armature 11'''' and the cylinders 2'''' and 27 respectively there are provided transverse walls 30, 31. Between these walls 30, 31 and the armature 11'''' there are provided respective springs 32, 33, which are supported on the walls and the armature.

The pistons 3'''' and 28 are rigidly connected to the armature 11'''' via piston rods 5'''' and 35 respectively. According to requirements, therefore, a force can be exerted on the armature 11'''' from either only one piston or both pistons.

FIG. 5 illustrates a fifth embodiment of an energy converter according to the invention.

The difference between the energy converters illustrated in FIG. 4 and FIG. 5 is that the two springs 36, 37 of the energy converter according to FIG. 5 are mounted between the armature 11'''' and flanges 38, 39 at the ends of the piston rods facing the armature. The pistons 3'''' and 40 thus influence the armature 11'''' via the springs.

The oscillating device comprises the springs 36, 37, the piston rods and the pistons 3'''' and 40.

Where the pistons are connected to the armature via one or two springs, the pistons can be secured relative to the housing, e.g., by abutting against a portion of the respective cylinder tops when the oscillating device is oscillating freely, and for example compressed combustion gas can be brought into the combustion chamber and ignited when a movement of the pistons is required.

If the armature is supported by the piston (FIG. 1) and only one piston is provided, the connection between the piston rod and the piston must be rigid. If the armature has a separate guide or control, the piston rod may be connected to the piston via a piston bolt.

Even though in FIGS. 4 and 5 two cylinders and pistons are illustrated which are mounted on each side of the armature, it will be understood that they may be mounted on the same side of the armature. Furthermore, more than two cylinders and pistons may be provided depending on requirements.

It is illustrated above that the energy which is supplied to the converter can be converted to electrical energy if the relatively small amount of energy is discounted which is consumed in overcoming the friction between the movable and the stationary components. It will be appreciated, however, that an energy converter of the above-mentioned type can be used as a gas generator for production of an energy-rich exhaust gas, whose energy can be exploited by a further energy conversion. For example a gas generator according to FIGS. 2–5 can be very easily controlled, since any combustion and thereby exhaust gas production can take place, e.g. every time the piston is located at its upper dead point, or a whole number of piston oscillations can be performed between each time a combustion occurs in the combustion chamber.

Furthermore, it is stated in the above that the elastic device is composed of springs, but it will be understood that any device can be employed which provides a return force which attempts to bring the body back to the neutral location N when the body is moved away from it. For example, the stator and the armature may comprise two pairs of interacting magnets with the same polarity, where between them is produced a force, which attempts to move the magnets away from each other, and which is a function of the inverse value of the distance between the magnets. One pair may attempt to move the armature to the left and the other pair may attempt to move the armature to the right. Such magnets are particularly advantageous if the oscillation frequency of the armature and the piston is high, as will be apparent below.

In addition to a friction between the stationary and movable components, a resistance to the armature's movement will be exerted by the generator's stator.

By introducing combustion gas into the combustion chamber and producing a combustion process therein corresponding to the combustion process in traditional internal combustion engines, the rate of combustion will be a maximum of approximately 10 m/s. A corresponding slow increase is thereby obtained in the pressure of the gas in the combustion chamber and the force exerted thereby on the piston. A relatively small proportion of the energy contained in the combustion gases is hereby also converted to kinetic energy by the piston, since a correspondingly large proportion is converted to heat which is taken away from the engine. In an internal combustion engine of this type, the pressure of the combustion gases and the corresponding force exerted on the piston are maintained during a relatively long period of time, and if the energy in the combustion gases has to be transferred completely to the piston, the piston must move in the same direction during the power transfer, i.e. in the direction corresponding to an increase in the combustion chamber's volume, viz, away from the combustion chamber. It will be appreciated that if a natural frequency of the piston/armature/spring device is chosen which is too high, and after a few oscillations of this device there is a need to compensate for a reduction in the oscillation amplitude by implementing a combustion in the combustion chamber, the situation may arise that during the combustion the device is moved towards the combustion chamber and against the force exerted by the combustion gases on the piston, which may cause the piston and the armature to be braked instead of accelerated. The interval, hereinafter called the transfer interval, during which the force from the combustion gases can be transferred, and which is a function of the natural oscillation frequency of the armature, must therefore be sufficiently great, i.e. the natural frequency must be relatively low.

For linear generators with an oscillating armature/stator device and a stator, the efficiency, i.e. the proportion of the electrical energy which is converted in the generator, in relation to the armature's kinetic energy, is a function of the oscillation frequency.

In order to obtain a high oscillation frequency with an energy converter according to the invention, the natural frequency of the piston/armature/spring device, hereinafter called the armature frequency, consequently must be high.

With a high armature frequency there is a need for a rapid transfer of the energy of the fuel to the armature since the transfer interval is small. According to the invention, therefore, instead of the above-mentioned, relatively slow combustion of the fuel, a detonation or explosion of the fuel in the combustion chamber may be chosen. A very rapid combustion of the fuel and a very large output are thereby obtained. For example, by exploding a dynamite cartridge with a diameter of 10 mm, an output of 4 GW is obtained. A device will be described below for utilising this output in connection with a linear generator as indicated above.

FIGS. 6-8 illustrate a schematic longitudinal section through an embodiment of a combustion chamber 50 of a free piston engine of the above-mentioned type.

The combustion chamber 50 is defined by a cylinder 56 comprising a side wall 52 which is circular in cross section and an end wall 54, and a piston 58, which is axially movable towards or away from the cylinder 56, i.e. to the right or to the left in FIGS. 6-8. The piston 58 is connected to an armature of the generator (not shown), as mentioned above.

In the cylinder 56 there is provided a first aperture 60. In the aperture there is provided in the cylinder 56 a valve seat 62 for a valve 64, which can be moved in the direction of a double arrow A, towards or away from the valve seat 62 in the known per se manner. The valve 64 may be arranged for very rapid movement by means of a device of a suitable type, e.g. a solenoid 66. Alternatively, the valve may be moved by means of the piston via a device, e.g. a mechanism.

In the cylinder 56 there is further provided a second aperture 70, wherein there is arranged a nozzle 72. It will be understood, however, that instead of a valve 64 and a nozzle 72, either a valve or a nozzle may be provided in both apertures 60, 70. A first, gaseous fuel ingredient may be introduced into the combustion chamber 50 via the valve 64, and a second fuel ingredient may be introduced via the nozzle 72.

A right-hand end portion 76 of the piston 58 which is in the form of a circular, axially extending peripheral flange, has a short, radial internal cylinder surface 78, and radially inside this cylinder surface 78 the piston 58 may have a radially and plane surface 84.

The side wall 52 is trumpet-shaped and its left-hand end portion 80 is arranged to come into sealing abutment against the cylinder surface 78 when the piston 58 is located in a position wherein it has been moved a maximum distance to the right, as illustrated in FIG. 6. By moving the piston 58 a short distance to the left, away from the position illustrated in FIGS. 6-8, a small opening is formed between the piston 58 and the cylinder 56, thus enabling combusted material to be removed from the combustion chamber 50, e.g. in a manner which will be described more fully in connection with FIG. 9.

If a combustion requires to be performed in the combustion chamber when the piston is in sealing abutment against the cylinder's left-hand end portion 80, the first step is to open the valve 64. A fixed amount of the first fuel ingredient is then introduced into the combustion chamber 50 via an opening between the valve 64 and its seat 62, as indicated by curved arrows in FIG. 6. As illustrated in FIG. 7, the valve 64 is then closed and a fixed amount of the second fuel ingredient is introduced into the combustion chamber 50 via the nozzle 72. The fuel ingredients may be of a type which, when mixed, instantly initiate a powerful chemical reaction, with the result that a detonation or explosion then immediately occurs in the combustion chamber, as illustrated in FIG. 8.

The pressure front obtained during the detonation or explosion may typically move at a speed of up to 9 km/s towards the piston 58. On account of the curved shape of the cylinder's side wall 52, the pressure front acquires a shape which is approximately parallel to the flat surface 84. It will be appreciated that the shape of the wall may be different from that which is illustrated schematically here. All portions of the pressure front therefore strike the piston simultaneously and the pressure front's energy is transferred to the piston in the course of a very short time. It will be understood that the time taken for the transfer of heat energy from the combusted material in the combustion chamber to its surroundings is very short and that a loss of heat energy from the combustion chamber will be very slight. Since the piston's movement is transferred directly to the armature, i.e. without the piston's linear movement being converted to a rotary motion via additional components of the device, a very slight energy loss is obtained due to friction between components moving relative to one another.

In FIG. 9 it is illustrated that instead of the above-mentioned two fuel ingredients, explosive charges of, e.g. a solid explosive may be introduced sequentially into the combustion chamber.

As illustrated in this figure, a combustion chamber 100 is defined by a cylinder 102 and a piston 104, which are substantially similar in form to those illustrated in FIGS. 6-8. The only essential difference is that in the cylinder 102, or more precisely its rear wall 106, there is provided a cylindrical, axially extending chamber 108, which communicates with the combustion chamber 100 via a narrowed portion 110, thus forming a contact shoulder 112 facing to the right in FIG. 9.

On the outside of the cylinder 102 there is arranged a substantially axially movable push body 114, whose left-hand end portion together with an adjacent area of the piston 104 and the cylinder 102 define a pressure compartment 116.

The right-hand end portion of the push body 114 is arranged to abut against a sliding piece 132 which is arranged to slide axially in a guide tube or holder 120 which is securely connected to the cylinder 102. The sliding piece 132 is influenced by a spring device 122, which attempts to move the sliding piece 132 and thereby the push body 114 to the left in FIG. 9 relative to the guide tube 120. In the axial extension of the cylinder 102, near the sliding piece 132, there is provided an ignition piece 134. In the sliding piece 132 there is provided a groove 136, which is open to the ignition piece 134, and the ignition piece 134 has a pin 138 which is arranged to project into the groove 136, and which is slightly shorter than the groove 136, considered in the axial direction.

In the lower portion of the guide tube 120, e.g., there is provided an aperture 124 and to the guide tube 120 there is attached near the opening a magazine 126, which extends radially away from the guide tube 120.

The cylinder chamber 108 is arranged to receive an explosive body 128 whose shape is adapted to the cylinder chamber 108, the explosive body's position in the axial direction being determined by the abutment of its left-hand end portion against the contact shoulder 112.

The magazine 126 is arranged to receive a series of explosive bodies 130, these being stacked in the magazine 126 beside one another, whereby they are forced by a pushing device (not shown) in the direction towards the aperture 124. In a known manner, the explosive body's explosive and possibly the above-mentioned explosive ingredients may contain the oxygen required for an explosion of the explosive material.

Furthermore, the arrangement of the piston 104, the generator's armature and the springs which attempt to move them in order to create an oscillation are substantially of the type illustrated in FIG. 3.

A successive firing and shifting of explosive bodies in the cylinder chamber 108 will now be described in more detail, on the assumption that an explosive body 128 is initially located in the cylinder chamber 108 and a series of explosive bodies 130 are stacked in the magazine 126. It is further assumed that the piston 104, the sliding piece 132 and the ignition piece 134 are initially located in the position illustrated in FIG. 9.

The explosive body 128 which is located in the cylinder chamber 108 may be caused to explode, e.g., by means of electrical energy, which is supplied to the explosive body via an electrical ignition circuit (not shown), or, e.g., by the ignition piece 134 being gripped via a hoop 140, moved slightly to the right against the force exerted by the spring 122 and released, whereupon the ignition piece 134 is moved in the opposite direction on account of the spring 122 and the kinetic energy, which is released by the ignition piece's impact against the explosive body 128, causes an explosion thereof.

Due to the detonation pressure front, which is created after the explosion and which influences the piston 104, the piston 104 is moved very rapidly to the left in FIG. 9, thereby receiving a very large amount of kinetic energy. Since the piston is moved away from the cylinder, an opening is formed between the cylinder and the piston via which explosion residue in the cylinder chamber 108 under great pressure can flow into the pressure compartment 116, where it puts pressure on the push body 114 for a short period, thus causing it and thereby the sliding piece 132 to be moved to the right, whereby the spring 122 is compressed and constricted. When the left-hand end of the sliding piece's groove 136 comes into abutment against the pin 138, the ignition piece 134, which hitherto has been in abutment against the cylinder chamber's right-hand end, is also carried along.

When the sliding piece 132 and the ignition piece 134 have been moved so far axially that they no longer cover the aperture 124 in the guide tube 120, the explosive body 130 which is located nearest the guide tube 120 is pushed into it via the aperture 124. On account of the increased force of the spring 122, however, the sliding piece 132 and the ignition piece 134 will be reversed and moved to the left approximately at the moment when the explosive body is axially aligned with the cylinder chamber 108, whereupon the explosive body 130 is pushed into the cylinder chamber 108.

During this process the piston 104 has also been reversed and moved back to renewed abutment against the cylinder on account of the springs influencing the piston and the armature. The ignition piece's pin 138 is hereby located in the right-hand portion of the groove. When the left-hand end of the explosive body 130 comes into abutment against the contact shoulder 112, the explosive body 130 is stopped while the ignition piece 134 is pressed with great force against the explosive body's right-hand end portion. The explosive body 130 in the cylinder chamber 108 is thereby caused to explode and the above-mentioned process is repeated.

In a second embodiment of the invention whereby an explosive body located in the cylinder chamber 108 can be caused to explode according to other criteria determined by the piston's movement parameters, sensors (not shown) may be provided for measuring these movement parameters, such as the piston's axial position, amplitude, etc. These sensors (not shown) may for example be arranged to transmit signals to a computer (not shown) which calculates the values of the parameters, and which, e.g., is arranged to transmit an electrical firing signal to the cylinder chamber 108 via a suitable ignition circuit (not shown) for ignition of the explosive body which may momentarily be located in the cylinder chamber 108.

When there is a need for a supply of energy to the piston/armature device, e.g. on account of an excessive reduction in its amplitude, at a time which has been determined by the computer on the basis of the signals received from the sensors, an ignition signal is supplied to the explosive body 128 which is located in the cylinder chamber 108, with the result that the explosive body 128 explodes. A new explosive charge is then brought into the cylinder chamber 108 and caused to explode in the above-described manner after the next oscillation period or a multiple of periods.

In FIG. 10 a further embodiment of an energy converter according to the invention is illustrated, where the springs, which influence the piston and the armature, and which are illustrated in FIG. 9, have been replaced by four pairs of interacting magnets 150 and 152 respectively with the same polarity. By this means enormous forces can be created which can cause a reversal of the movement of the piston/armature device during its oscillation, thus preventing any collision between stationary and moving components.

Instead of arranging separate explosive bodies in a magazine, the explosive bodies may be arranged on a belt which is driven by means of a suitable device, e.g. like that used for operating a machine gun.

What is claimed is:

1. An energy converter comprising:

a stationary part with a combustion chamber with an opening having a circumferential opening edge portion;

a movable part having a first end which is facing away from the opening and an axially opposite second end with a circumferential edge portion which is adapted to abut the edge portion of the stationary part and thereby close the opening, the movable part being axially displaceable away from the stationary part responsive to explosion or detonation of an explodable or detonable material within the combustion chamber; and a body which is connected to the first end of the movable part via an element having a spring-like resiliency in the axial direction, and which is adapted to be brought to a free oscillatory movement in the axial direction under the influence of the element after a temporary axial displacement of the movable part, the movable part being adapted to be biased by the element towards the opening and to abut the opening edge portion, and to be moved away from the opening edge portion against the influence of the element by a detonation of the material and thereby to open the combustion chamber.

2. The energy converter according to claim 1, wherein the body is an armature of an electric linear generator.

3. The energy converter according to claim 1, wherein the cross section area of the combustion chamber is increasing axially towards the opening.

* * * * *